US011902093B2

(12) United States Patent
Hao et al.

(10) Patent No.: US 11,902,093 B2
(45) Date of Patent: Feb. 13, 2024

(54) CONFIGURATION METHOD AND RELATED DEVICE (71) Applicant: HUAWEI TECHNOLOGIES CO., LTD., Shenzhen (CN)

(72) Inventors: Weiguo Hao, Nanjing (CN); Bayaer Dahu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/721,043

(22) Filed: Apr. 14, 2022

(65) Prior Publication Data

US 2022/0239560 A1 Jul. 28, 2022

Related U.S. Application Data (63) Continuation of application No. PCT/CN2020/118203, filed on Sep. 27, 2020.

(30) Foreign Application Priority Data

Oct. 17, 2019 (CN) .......................... 201910990152.3

(51) Int. Cl.
*H04L 41/084* (2022.01)
*H04L 41/122* (2022.01)
*H04L 12/28* (2006.01)

(52) U.S. Cl.
CPC ...... *H04L 41/0846* (2013.01); *H04L 12/2898* (2013.01); *H04L 41/122* (2022.05)

(58) Field of Classification Search
CPC ............... H04L 2463/082; H04L 41/08; H04L 41/0803; H04L 41/0806
See application file for complete search history.

(56) References Cited

U.S. PATENT DOCUMENTS

| 10,383,461 | B2* | 8/2019 | Zakirov | G07G 1/0045 |
| 2003/0225547 | A1* | 12/2003 | Paradies | H05K 13/0882 |
| | | | | 702/150 |
| 2008/0005275 | A1 | 1/2008 | Overton et al. | |
| 2014/0122580 | A1* | 5/2014 | Nuaimi | H04L 63/0281 |
| | | | | 709/203 |
| 2015/0262021 | A1 | 9/2015 | Som De Cerff | |
| 2017/0119955 | A1* | 5/2017 | Portnoy | G16H 40/20 |

(Continued)

FOREIGN PATENT DOCUMENTS

| CN | 101771692 A | 7/2010 |
| CN | 104978652 A | 10/2015 |

(Continued)

*Primary Examiner* — Douglas B Blair
(74) *Attorney, Agent, or Firm* — Rimon PC (57) ABSTRACT Embodiments of this application disclose a configuration method that may be applied to a software-defined wide area network (SD-WAN). The method includes: receiving a correspondence between a device identifier of a first device and a first location; sending, to the first device, a verification request related to verifying whether the first device is located at the first location; receiving a verification response to the verification request; and determining, based on the verification response, whether to send configuration information corresponding to the first location to the first device. The methods in the embodiments of this application may be implemented by a software-defined network (SDN) controller.

19 Claims, 4 Drawing Sheets (56) References Cited

U.S. PATENT DOCUMENTS

| | | | |
|---|---|---|---|
| 2017/0230827 A1 | 8/2017 | Rolls, IV | |
| 2017/0346851 A1* | 11/2017 | Drake | H04L 9/0838 |
| 2018/0121921 A1* | 5/2018 | Woo | H04W 12/06 |
| 2019/0165997 A1 | 5/2019 | Shaikh et al. | |
| 2020/0059468 A1* | 2/2020 | Wolosewicz | G10L 15/22 |
| 2020/0196093 A1* | 6/2020 | Wendt | H04W 4/023 |
| 2020/0374287 A1* | 11/2020 | Bowie | H04W 12/06 |
| 2021/0321910 A1* | 10/2021 | Cabrera | G16H 20/40 |

FOREIGN PATENT DOCUMENTS

| | | |
|---|---|---|
| CN | 105100072 A | 11/2015 |
| CN | 105100096 A | 11/2015 |
| CN | 105471641 A | 4/2016 |
| CN | 106101995 A | 11/2016 |
| CN | 107508707 A | 12/2017 |
| CN | 108833506 A | 11/2018 |
| WO | 2015066422 A2 | 5/2015 |

* cited by examiner

CONFIGURATION METHOD AND RELATED DEVICE

CROSS-REFERENCE TO RELATED APPLICATIONS

This application is a continuation of International Application No. PCT/CN2020/118203, filed on Sep. 27, 2020, which claims priority to Chinese Patent Application No. 201910990152.3, filed on Oct. 17, 2019. The disclosures of the aforementioned applications are hereby incorporated by reference in their entireties.

TECHNICAL FIELD

Embodiments of this application relate to the communication field, and in particular, to a configuration method and a related device.

BACKGROUND

Generally, enterprise branches are interconnected with a rented line or network from a carrier. A software defined WAN (SD-WAN) is a solution to implementing an efficient and secure connection between enterprise branches or between an enterprise branch and a public cloud/private cloud. The branch herein corresponds to a site in the SD-WAN network, and the enterprise branches are interconnected by using a customer-premises equipment (CPE) device. Each CPE device has a unique electronic serial number (ESN) at delivery.

Before an enterprise branch goes online, a carrier in the SD-WAN network generally needs to plan and configure a corresponding site on a software-defined network (SDN) controller. The plan and configuration includes deployment of a specific CPE and its corresponding ESN (the ESN of each CPE device is unique), configuration of a virtual private network (VPN), wide area network (WAN) side and local area network (LAN) side services, and the like. Then, the CPE is sent to the deployment site corresponding to the CPE. An onsite deployment person scans a two-dimensional code or a bar code of the CPE device to obtain the ESN, and configures a correspondence between the ESN of the CPE and the deployment site on the SDN controller. The CPE accesses a network and establishes a connection with the SDN controller. The CPE reports its ESN. The SDN controller searches for a corresponding site based on the ESN and then delivers a corresponding service configuration to the CPE, so that the branch site where the CPE is located can access another branch site of the enterprise, including a headquarters site.

In the current technology, the two-dimensional code or the bar code may be incorrectly pasted or maliciously tampered with, and in this case, the ESN obtained by scanning the code may correspond to an incorrect CPE. Consequently, an unauthorized user may access another branch site of the enterprise by using the incorrect CPE, resulting in information leakage.

SUMMARY

Embodiments of this application provide a configuration method and a related device, to avoid information leakage when a two-dimensional code is incorrectly pasted or maliciously tampered with.

A first aspect of the embodiments of this application provides a configuration method, including:

When producing a first device, a vendor of the first device incorporates a unique device identifier as the unique identifier of the first device. In actual application, the device identifier of the first device is generally made into a two-dimensional code, a bar code, a nameplate, or the like and pasted on the first device. However, the device identifier of the first device may be incorrectly pasted on a second device. In this case, the device identifier of the first device may be obtained by scanning a two-dimensional code on the housing of the onsite second device. A correspondence between the device identifier of the first device and the location of the first device is received according to a selection. Since the two-dimensional code may be incorrect, a verification request is sent to the first device, where the verification request is related to verifying whether the first device is located at a first location. A verification response corresponding to the verification request is received, and whether to send configuration information corresponding to the first location to the first device is determined based on the verification response.

In this embodiment of this application, after the first device goes online, the verification request related to verifying whether the first device is located at the first location is sent to the first device; the verification response to the verification request is received; and whether to send the configuration information corresponding to the first location to the first device is determined based on the verification response. This avoids the risk of enterprise information leakage caused by the first device being able to access an enterprise internal site without being at the first location when a two-dimensional code is incorrectly pasted or maliciously tampered with.

Based on the first aspect of the embodiments of this application, in a first implementation of the first aspect of the embodiments of this application, there are a plurality of manners of determining whether to send the configuration information corresponding to the first location to the first device. For example, the verification request is to request to verify whether an indicator of the first device is turned on in a predetermined manner. For example, a red indicator is on or a green indicator is on.

In this embodiment of this application, the verification request is determined based on whether the indicator is turned on in the predetermined manner, so that an onsite person can directly determine whether the first device is at the first location.

Based on the first aspect of the embodiments of this application, in a second implementation of the first aspect of the embodiments of this application, there are a plurality of manners of determining whether to send the configuration information corresponding to the first location to the first device. For example, the verification request is to request to verify whether a speaker of the first device produces a sound in a predetermined manner. For example, the sound is "correct" or "location matched".

In this embodiment of this application, the verification request is determined based on whether the speaker is turned on in the predetermined manner, so that the onsite person can use a simple manner of listening to the sound to determine whether the first device is at the first location.

Based on the first aspect of the embodiments of this application, in a third implementation of the first aspect of the embodiments of this application, the method is performed by a software-defined network SDN controller.

In this embodiment of this application, an execution body of the method is limited, so that feasibility of the solutions is improved.

Based on the first aspect of the embodiments of this application, in a fourth implementation of the first aspect of the embodiments of this application, the first device is a customer-premises equipment CPE.

In this embodiment of this application, the specific first device is limited, so that the feasibility of the solutions is improved.

Based on any one of the first aspect of the embodiments of this application or the implementations of the first implementation of the first aspect to the fourth implementation of the first aspect, in a fifth implementation of the first aspect of the embodiments of this application, the verification request is used to request to verify whether the first device is located at the first location.

In this embodiment of this application, the specific verification request is limited, so that the feasibility of the solutions is improved.

Based on any one of the first aspect of the embodiments of this application or the implementations of the first implementation of the first aspect to the fourth implementation of the first aspect, in a sixth implementation of the first aspect of the embodiments of this application, the verification request is used to request to determine credibility of the first device based on whether the first device is located at the first location.

In this embodiment of this application, the specific verification request is limited, so that the feasibility of the solutions is improved.

Based on any one of the first aspect of the embodiments of this application or the implementations of the first implementation of the first aspect to the fourth implementation of the first aspect, in a seventh implementation of the first aspect of the embodiments of this application, the verification request is used to request to determine, based on whether the first device is located at the first location, whether to send the configuration information corresponding to the first location to the first device.

In this embodiment of this application, the specific verification request is limited, so that the feasibility of the solutions is improved.

A second aspect of the embodiments of this application provides a controller, including:
a receiving unit, configured to receive a correspondence between a device identifier of a first device and a first location;
a sending unit, configured to send, to the first device, a verification request related to verifying whether the first device is located at the first location, where
the receiving unit is further configured to receive a verification response to the verification request; and
a determining unit, configured to determine, based on the verification response, whether to send configuration information corresponding to the first location to the first device.

In this embodiment of this application, the sending unit sends, to the first device, the verification request related to verifying whether the first device is located at the first location, and the determining unit determines, based on the verification response to the verification request, whether to send the configuration information corresponding to the first location to the first device. This avoids the risk of enterprise information leakage caused by the first device being able to access an enterprise internal site without being at the first location when a two-dimensional code is incorrectly pasted or maliciously tampered with.

Based on the second aspect of the embodiments of this application, in a first implementation of the second aspect of the embodiments of this application, there are a plurality of manners of determining whether to send the configuration information corresponding to the first location to the first device. For example, the verification request is to request to verify whether an indicator of the first device is turned on in a predetermined manner. For example, a red indicator is on or a green indicator is on.

In this embodiment of this application, the verification request is determined based on whether the indicator is turned on in the predetermined manner, so that an onsite person can directly determine whether the first device is at the first location.

Based on the second aspect of the embodiments of this application, in a second implementation of the second aspect of the embodiments of this application, there are a plurality of manners of determining whether to send the configuration information corresponding to the first location to the first device. For example, the verification request is to request to verify whether a speaker of the first device produces a sound in a predetermined manner. For example, the sound is "correct" or "location matched".

In this embodiment of this application, the verification request is determined based on whether the speaker is turned on in the predetermined manner, so that the onsite person can use a simple manner of listening to the sound to determine whether the first device is at the first location.

Based on the second aspect of the embodiments of this application, in a third implementation of the second aspect of the embodiments of this application, the first device is a customer-premises equipment CPE.

In this embodiment of this application, the specific first device is limited, so that feasibility of the solutions is improved.

Based on any one of the second aspect of the embodiments of this application or the first implementation of the second aspect to the third implementation of the second aspect, in a fourth implementation of the second aspect of the embodiments of this application, the verification request is used to request to verify whether the first device is located at the first location.

In this embodiment of this application, the specific verification request is limited, so that the feasibility of the solutions is improved.

Based on any one of the second aspect of the embodiments of this application or the first implementation of the second aspect to the third implementation of the second aspect, in a fifth implementation of the second aspect of the embodiments of this application, the verification request is used to request to determine credibility of the first device based on whether the first device is located at the first location.

In this embodiment of this application, the specific verification request is limited, so that the feasibility of the solutions is improved.

Based on any one of the second aspect of the embodiments of this application or the first implementation of the second aspect to the third implementation of the second aspect, in a sixth implementation of the second aspect of the embodiments of this application, the verification request is used to request to determine, based on whether the first device is located at the first location, whether to send the configuration information corresponding to the first location to the first device.

In this embodiment of this application, the specific verification request is limited, so that the feasibility of the solutions is improved.

A third aspect of the embodiments of this application provides a controller, and the controller performs the method in the first aspect.

A fourth aspect of the embodiments of this application provides a computer storage medium. The computer storage medium stores instructions, and when the instructions are run on a computer, the computer is enabled to perform the method in the first aspect.

A fifth aspect of the embodiments of this application provides a computer program product. When the computer program product runs on a computer, the computer is enabled to perform the method in the first aspect.

DESCRIPTION OF EMBODIMENTS

Embodiments of this application provide a configuration method and a related device, to avoid the risk of enterprise information leakage when a two-dimensional code is incorrectly pasted or maliciously tampered with.

Figure 1:
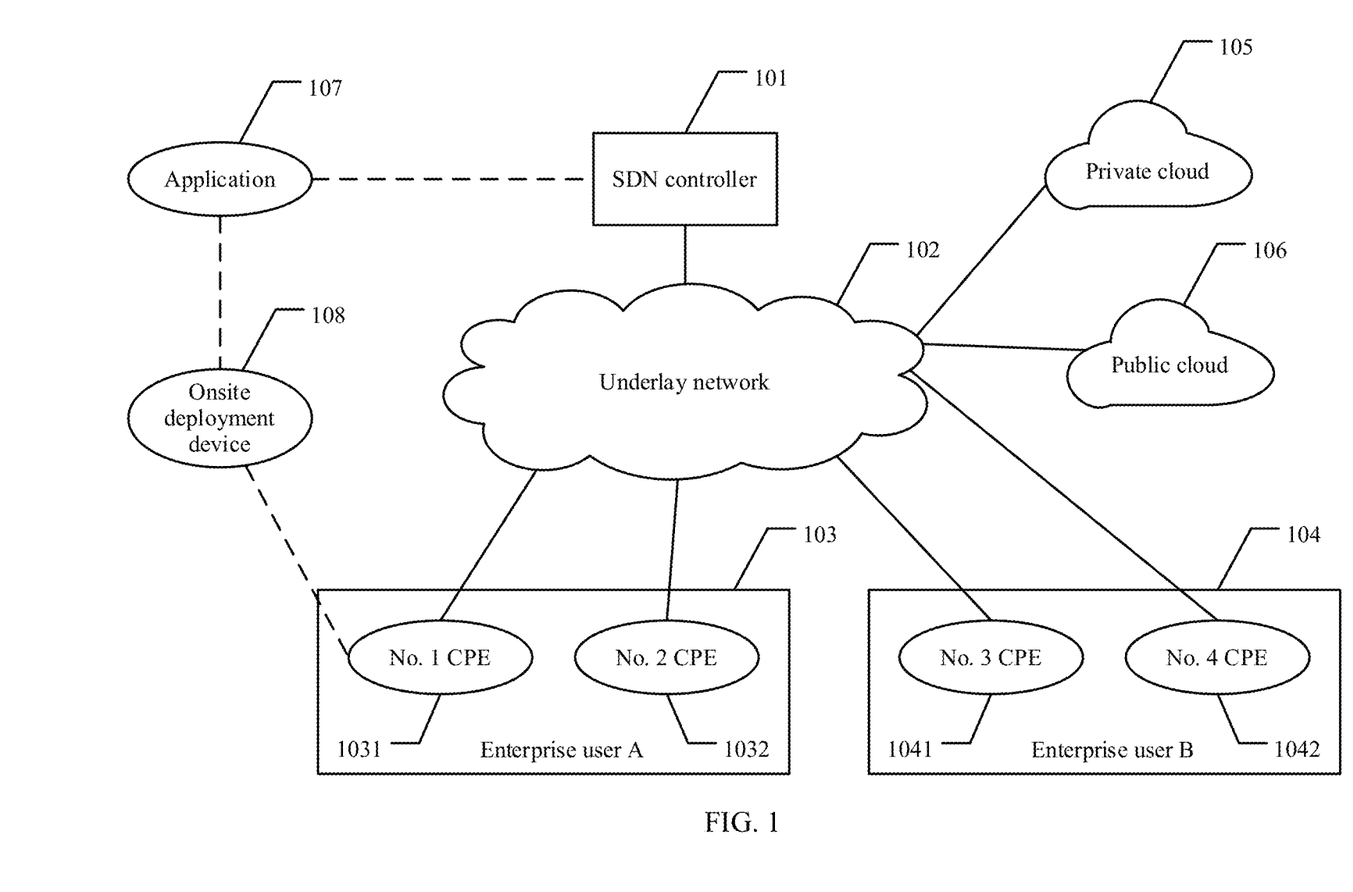
FIG. 1 is a schematic diagram of a network framework according to an embodiment of this application.

Referring to FIG. 1, a network framework in the embodiments of this application includes:

an SDN controller 101, an underlay network 102, an enterprise user A 103, No. 1 CPE 1031, No. 2 CPE 1032, an enterprise user B 104, No. 3 CPE 1041, No. 4 CPE 1042, a private cloud 105, a public cloud 106, an application 107, and an onsite deployment device 108.

The SDN controller 101 is connected to the application 107, and the SDN controller is connected to the No. 1 CPE 1031, the No. 2 CPE 1032, the enterprise user B 104, the No. 3 CPE 1041, the No. 4 CPE 1042, the private cloud 105, and the public cloud 106 through the underlay network 102.

The main function of the SDN controller 101 is to: manage the No. 1 CPE 1031, the No. 2 CPE 1032, the No. 3 CPE 1041, and the No. 4 CPE 1042, and deliver a service configuration. The service configuration is tunnel configuration information between the CPEs.

The SDN controller 101 may manage the CPE devices in a southbound direction by using a network configuration protocol (NETCONF), and may be interconnected with a third-party application (for example, the application 107) in a northbound direction by using an application programming interface (API) and a simple object access protocol (SOAP) interface that are in a representational state transfer (REST) architecture.

The main function of the underlay network 102 is to connect the enterprise user A 103 or the enterprise user B 104 to the private cloud 105 or the public cloud 106, to implement an interconnection between two sites at both ends.

The private cloud 105 is a dynamic configuration pool of public cloud computing resources and used for data transmission between a private enterprise and a cloud service provider by using an encryption protocol, a tunnel protocol, and another security procedure.

The public cloud (PC) 106 may be an Alibaba Cloud, or may be a Tencent Cloud. In actual application, the public cloud 106 may alternatively be Amazon Web Services (AWS), a Huawei Cloud, or a software as a service (SaaS) cloud.

The main function of the application 107 is to establish a connection between the SDN controller 101 and the onsite deployment device 108.

An onsite deployment person may access a site list of the SDN controller 101 by using the onsite deployment device 108 and the application 107.

In the embodiments of this application, the underlay network 102 may be an internet, or may be a multi-protocol label switching (MPLS) network. It can be understood that, in actual application, the underlay network 102 may alternatively be another wide area network (WAN) interconnection technology. For example, the underlay network 102 may alternatively be a long term evolution network (LTE). As long as the WAN can provide internet protocol (IP) routing reachability for the CPEs of the two sites at both ends, an SD-WAN tunnel may be established at both ends. This is not specifically limited herein.

The enterprise user A 103 and the enterprise user B 104 are interconnected by renting a line or a network of a carrier. An SD-WAN is a solution for implementing an efficient and secure connection between an enterprise branch and another enterprise branch or between an enterprise branch and a public cloud/private cloud. A controller of the SD-WAN network is an SDN controller. The No. 1 CPE 1031, the No. 2 CPE 1032, the No. 3 CPE 1041, and the No. 4 CPE 1042 in FIG. 1 correspond to sites in the SD-WAN network. The interconnection between enterprise branches is implemented by using the CPEs. For example, two enterprise branches inside the enterprise user A 103 in FIG. 1 are interconnected by using the No. 1 CPE 1031 and the No. 2 CPE 1032. Each CPE has a unique electronic serial number ESN at delivery, and each CPE can support one or more WAN connections.

CPEs of different enterprises may be interconnected through an overlay tunnel. For example, the No. 2 CPE 1032 of the enterprise user A 103 and the No. 3 CPE 1041 of the enterprise user B 104 in FIG. 1 may be interconnected through an overlay tunnel. The overlay tunnel in the embodiments of this application may be an internet protocol security (IPsec) tunnel, or may be a virtual extensible local area network (vxlan) tunnel. It can be understood that, in actual application, the overlay tunnel may alternatively be a generic routing encapsulation (gre) tunnel, or may be a combination of these tunnels. This is not specifically limited herein.

In the embodiments of this application, only an example in which two enterprise users respectively have two CPEs is used. It can be understood that, in actual application, there may be one or more enterprise users, and the enterprise users may have a plurality of CPEs. This is not limited herein.

In the embodiments of this application, the CPE may be a universal customer premises equipment (uCPE), or may be a gateway. It can be understood that, in actual application, the CPE may be another device. For example, the CPE may alternatively be a virtual customer premises equipment (vCPE). This is not specifically limited herein.

The following describes the configuration method in the embodiments of this application with reference to the network framework in FIG. 1.

Figure 2:
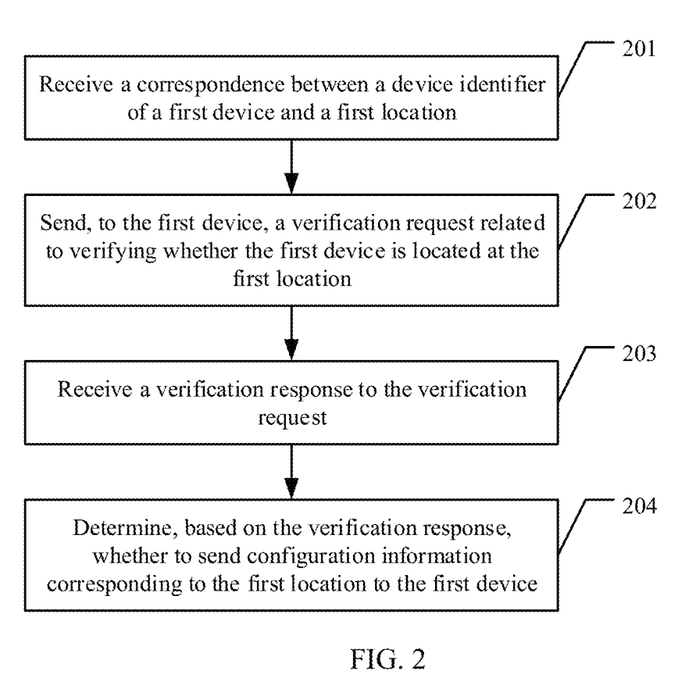
FIG. 2 is a schematic flowchart of a configuration method according to an embodiment of this application.

Referring to FIG. 2, an embodiment of the configuration method in the embodiments of this application includes the following steps:

201. Receive a correspondence between a device identifier of a first device and a first location.

When producing the first device, a vendor of the first device incorporates a unique device identifier as the unique identifier of the first device. In actual application, the device identifier of the first device is generally made into a two-dimensional code, a bar code, a nameplate, or the like and pasted on the first device. However, the device identifier of the first device may be incorrectly pasted on a second device. In this case, the device identifier of the first device may be obtained by scanning a two-dimensional code on a housing of the onsite second device. It can be understood that, in actual application, the device identifier of the first device is obtained by scanning the two-dimensional code and the bar code, for example, the device identifier may be obtained by using a near field communication technology (NFC), and certainly, the device identifier may alternatively be obtained by using a specification of the first device. This is not specifically limited herein.

After the second device arrives onsite, a device identifier of the second device may be obtained by scanning a two-dimensional code on the housing of the onsite second device by using application software or a device. The device identifier may be the device identifier of the first device, or may be the device identifier of the second device. After an onsite deployment person or an onsite deployment device selects the first location from a site list pre-created by a carrier, and maps the device identifier to the first location to obtain a correspondence, a controller receives the correspondence between the device identifier of the first device and the first location, which is sent by the onsite deployment person or the onsite deployment device.

In this embodiment of this application, the first device may be a customer-premises equipment CPE, or may be a universal customer premises equipment uCPE. It can be understood that, in actual application, the first device may be another device. For example, the first device may be a virtual customer-premises equipment vCPE, a gateway, or a client device. This is not specifically limited herein.

In this embodiment of this application, the device identifier may be an electronic serial number (ESN), or may be an identifier on a nameplate. It can be understood that, in actual application, the device identifier may alternatively be an identifier. This is not specifically limited herein.

202. Send, to the first device, a verification request related to verifying whether the first device is located at the first location.

After the first device goes online, the verification request related to verifying whether the first device is located at the first location is sent to the first device. The verification request may be performed by using a plurality of devices or a plurality of manners. The following separately describes the plurality of devices or the plurality of manners:

1: Indicator

The verification request may be used to request the first device to turn on at least one indicator of the first device in a predetermined manner. For example, a green indicator of the first device may be on for 5 seconds, or a red indicator of the first device may be on for 3 seconds, or the green indicator of the first device may flash three times within 5 seconds. It can be understood that a quantity of the indicators and the predetermined manner may be various. For example, the red indicator and the green indicator of the first device may be on alternately for 10 seconds. This is not specifically limited herein.

Time for which the red indicator or the green indicator is on may be specified. If there are a plurality of indicators on a panel of the first device, for example, 1, 2, 3, and 4, it may be specified that indicators 1 and 3 are on for 10 seconds and indicators 2 and 4 are off, or it may be specified that indicators 2 and 4 are on for 10 seconds after indicators 1 and 3 are on for 10 seconds. In conclusion, the flashing manner of the indicators on the panel of the first device may be specified.

2: Speaker

The verification request may be further used to request a speaker of the first device to produce a sound in a predetermined manner. The speaker of the first device may produce a sound of "matched" or may produce a sound of "correct". There are many cases in which the speaker produces a sound in a predetermined manner. For example, music may alternatively be played. This is not specifically limited herein.

In this embodiment of this application, the verification request may be performed by using the indicator or the speaker. It can be understood that, in actual application, the verification request may alternatively be performed by using a plurality of devices or a plurality of predetermined manners, for example, image matching. This is not specifically limited herein.

In this embodiment of this application, the verification request may be used to request to determine credibility of the first device based on whether the first device is located at the first location, and the verification request may be further used to request to determine, based on whether the first device is located at the first location, whether to send configuration information corresponding to the first location to the first device.

203. Receive a verification response to the verification request.

After the verification request related to verifying whether the first device is located at the first location is sent to the first device, an attempt may be made to receive the verification response to the verification request.

204. Determine, based on the verification response, whether to send the configuration information corresponding to the first location to the first device.

The configuration information corresponding to the first location may be preset by the carrier, or may be preset by a user. It can be understood that, in actual application, the configuration information may be set by another device or at another time, as long as the configuration information is set before this step. This is not limited herein.

After the verification response is received, there may be many reasons to determine not to send the configuration information corresponding to the first location to the first device. The reasons are described below:

1. Whether the verification response corresponds to the verification request:

The onsite deployment person or the onsite deployment device checks whether the second device on which the real device identifier of the first device is pasted performs the verification response. As described in the foregoing examples, the onsite deployment person or the onsite deployment device checks whether the second device turns on an indicator or plays a sound in a predetermined manner.

If the second device performs the verification request, it indicates that the second device is the first device, the two-dimensional code or the bar code is not incorrectly pasted, and the configuration information corresponding to the first location is determined to be sent to the first device. If the second device does not perform the verification request, it indicates that the second device is not the first device, the two-dimensional code or the bar code is fake, and the configuration information corresponding to the first location is determined not to be sent to the first device.

2. Whether the verification response is received:

If the verification response is received, it is determined to send the configuration information corresponding to the first location to the first device. If the verification response is not received, it is determined not to send the configuration information corresponding to the first location to the first device.

For ease of understanding, the following schematically describes an example in which the first device is an online CPE, the second device is an onsite CPE, the device identifier is an electronic serial number ESN, a real device identifier corresponding to the first device is an actual ESN, and a real device identifier corresponding to the second device is a target ESN.

Figure 3:
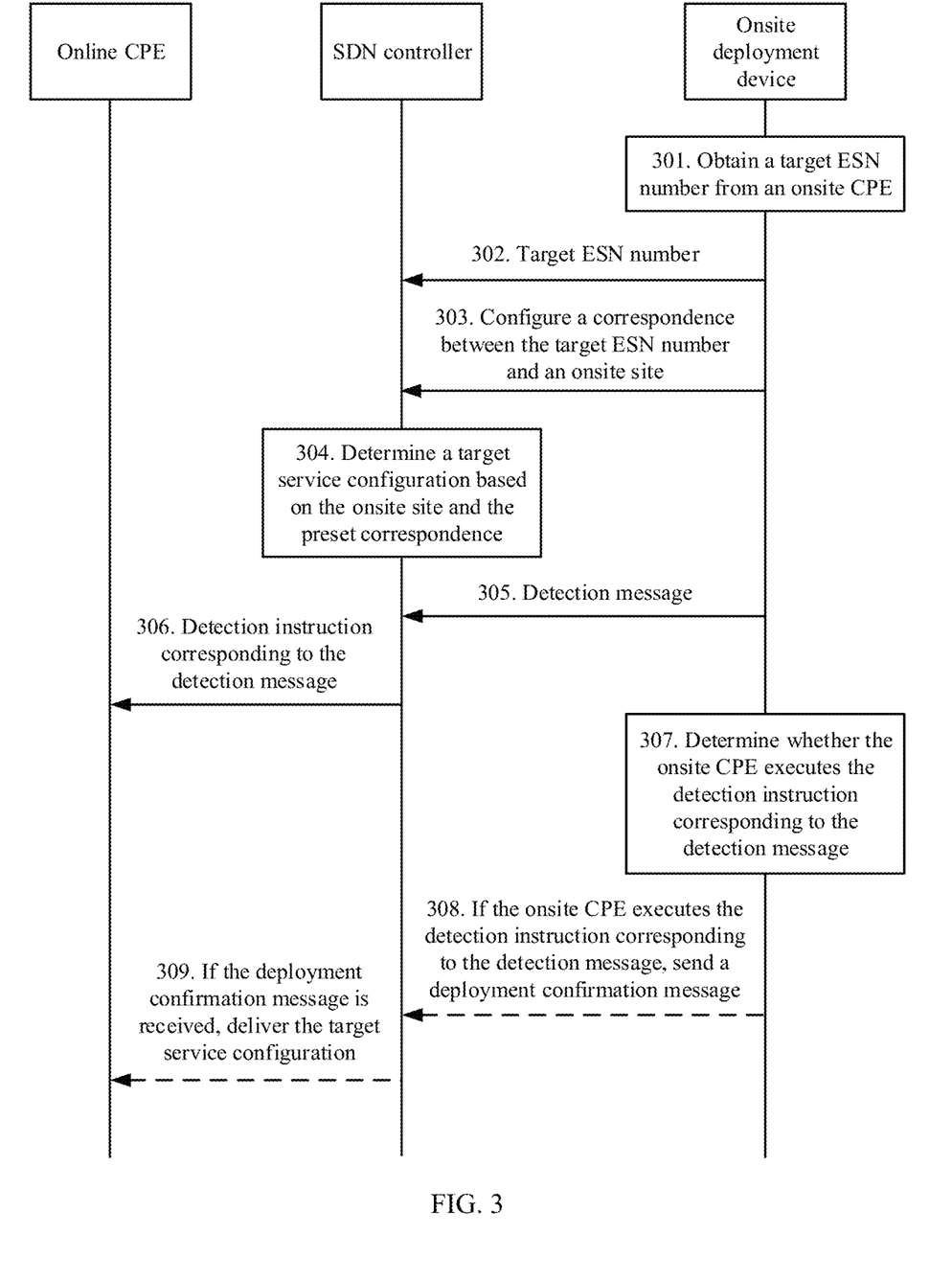
FIG. 3 is another schematic flowchart of a configuration method according to an embodiment of this application.

Referring to FIG. 3, another embodiment of the configuration method in the embodiments of this application includes the following steps:

301. An onsite deployment device obtains the target ESN from the onsite CPE.

When producing a CPE, a vendor of the CPE incorporates a unique ESN as a unique identifier of the CPE. In actual application, the ESN of the CPE is made into a two-dimensional code or a bar code and pasted on the CPE. When the CPE arrives onsite, the onsite deployment person may obtain the target ESN by scanning the two-dimensional code on a housing of the onsite CPE device by using the onsite deployment device, or the onsite deployment person may obtain the target ESN by scanning the bar code on the housing of the onsite CPE device by using the onsite deployment device. It can be understood that, in actual application, there are a plurality of manners for the onsite deployment device to obtain the target ESN from the onsite CPE. For example, the onsite deployment device may obtain the target ESN through NFC. Certainly, the onsite deployment person may alternatively directly obtain the target ESN from a specification of the onsite CPE and enter the target ESN into the onsite deployment device. This is not specifically limited herein.

302. The onsite deployment device sends the target ESN to an SDN controller.

The onsite deployment person pre-establishes a connection with the SDN controller by using a mobile phone APP or another device. After the onsite deployment device obtains the target ESN, the onsite deployment device may enter the target ESN to the SDN controller by using the mobile phone APP or another device.

303. The onsite deployment device configures a correspondence between the target ESN and an onsite site on the SDN controller.

After the SDN controller obtains the target ESN sent by the onsite deployment device, the onsite deployment device configures an empty device corresponding to the target ESN by using an API interface or a graphical interface of the SDN controller. In this case, the device has no service configuration. Then, the onsite deployment device queries preset SD-WAN sites by using the APP or the another device, selects one onsite site from the sites based on the geographical location of the onsite CPE, and configures a correspondence between the empty device and the onsite site by using the API interface or the graphical interface of the SDN controller.

304. The SDN controller determines a target service configuration based on the onsite site and a preset correspondence.

A correspondence between a site and a service configuration is preset in the SDN controller. The site includes the onsite site, and the service configuration includes the target service configuration. That the SDN presets the correspondence between the site and the service configuration may be performed before step 201, or before step 202, as long as the correspondence is preset before step 204. This is not specifically limited herein.

The service configuration includes at least one of service configurations of a VPN, a LAN, and a WAN side.

An ESN corresponding to a factory-set online CPE is the target ESN, that is, a real device corresponding to the target ESN is the online CPE. Because the two-dimensional code or the bar code is usually pasted on the CPE, the onsite CPE may be the online CPE, or may not be the online CPE. After the online CPE corresponding to the target ESN goes online, the online CPE applies for, by using a dynamic host configuration protocol (DHCP) request packet, an IP address and a domain name system (DNS) domain name or an IP address and a port number of the SDN controller from the SDN controller of a DHCP server. If the online CPE applies for the domain name, the DHCP server sends a DNS server address to the online CPE, and the online CPE actively connects to the DNS server and obtains the IP address corresponding to the domain name of the SDN controller. If a DHCP protocol is DHCPV4, the DHCP server usually notifies the DNS domain name or the IP address of the SDN controller of a DHCP client by using DHCP option 148. If a DHCP protocol is DHCPV6, the DHCP server usually notifies the DNS domain name or the IP address of the SDN controller of a DHCP client by using DHCP option 17. If the online CPE does not apply for the domain name, the online CPE directly obtains the IP address of the SDN controller.

After the online CPE obtains the IP address and the port number of the SDN controller, the online CPE establishes a netconf connection with the SDN controller by using a netconf callhome mechanism. The online CPE exchanges a certificate with the SDN controller. The certificate usually includes the target ESN. After verification of the certificate succeeds, the online CPE establishes a secure shell (SSH) connection with the SDN controller. The SDN controller may determine the target service configuration based on the onsite site and the preset correspondence. The target service configuration is configuration information of a tunnel that connects the online CPE and another CPE. After the SDN controller determines that the onsite site corresponds to the target service configuration, a state of the online CPE is set as a deployment pending state. The deployment pending state indicates that, the SDN controller only determines that the onsite site corresponds to the target service configuration, but does not deliver the target service configuration to the online CPE 305. The onsite deployment device sends a detection message to the SDN controller.

The onsite deployment person invokes an indicator flashing API interface to send the detection message to the SDN controller by using the onsite deployment device.

In this embodiment of this application, an example in which the detection message is an indicator flashing message is used for schematic illustration. It can be understood that the detection message may alternatively be a prompt tone message. In actual application, the detection message may alternatively be another message. For example, the detection message may alternatively be an image message. This is not specifically limited herein.

The indicator flashing message includes at least one of an indicator flashing type and indicator flashing time. For example, the indicator flashing message includes the indicator flashing type and the indicator flashing time. For example, the indicator flashing type is a green indicator. It can be understood that the indicator flashing type may alternatively be a red indicator. This is not specifically limited herein. For example, the indicator flashing time is 5 seconds. It can be understood that the indicator flashing time may alternatively be 10 seconds. This is not specifically limited herein.

The onsite deployment person invokes the indicator flashing API interface by using the onsite deployment device, to send the detection message to the SDN controller. The detection message is that the green indicator flashes for 5 seconds.

306. The SDN controller sends a detection instruction corresponding to the detection message to the online CPE.

After invoking the indicator flashing API interface by using the onsite deployment device, the onsite deployment person enters the target ESN. The SDN controller traverses online CPEs, finds the online CPE, and sends the detection instruction corresponding to the detection message to the online CPE by using the NETCONF. As described in the foregoing example, the SDN controller may send the detection instruction to the online CPE. The detection instruction is that the green indicator flashes for 5 seconds.

307. The onsite deployment device determines whether the onsite CPE executes the detection instruction corresponding to the detection message. If the onsite CPE executes the detection instruction, the onsite deployment device performs step 308. If the onsite CPE does not execute the detection instruction, the onsite deployment device does not send a deployment confirmation message to the SDN controller.

The onsite deployment person determines, by using the onsite deployment device, whether the onsite CPE executes the detection instruction corresponding to the detection message. As described in the foregoing example, the onsite deployment person determines whether the onsite CPE flashes the green indicator for 5 seconds. If the onsite CPE flashes the green indicator for 5 seconds, the onsite deployment person performs step 308. If the onsite CPE does not flash the green indicator for 5 seconds, the onsite deployment person does not send the deployment confirmation message to the SDN controller. The deployment confirmation message is used to indicate that the actual ESN of the onsite CPE is consistent with the target ESN.

308. If the onsite CPE executes the detection instruction corresponding to the detection message, the onsite deployment device sends the deployment confirmation message to the SDN controller.

If the onsite deployment device in step 307 determines that the onsite CPE executes the detection instruction corresponding to the detection message, as described in the foregoing example, if the onsite CPE flashes the green indicator for 5 seconds, the onsite deployment device determines that the actual ESN of the onsite CPE is consistent with the target ESN, and sends the deployment confirmation message to the SDN controller.

309. If the SDN controller receives the deployment confirmation message, the SDN controller delivers the target service configuration to the online CPE.

If the SDN controller receives the deployment confirmation message, the SDN controller may perform the target service configuration by using the NETCONF on an online CPE corresponding to the target ESN. In this case, the online CPE establishes an SD-WAN tunnel with another CPE and devices at the enterprise branch site where the online CPE is located can access other branch sites of the enterprise by using the online CPE.

In this embodiment, when the actual ESN of the onsite CPE is inconsistent with the target ESN, the onsite deployment device does not send the deployment confirmation message to the SDN controller. In this case, the SDN controller does not deliver the service configuration to the online CPE. This avoids the risk of enterprise information leakage caused by the online CPE being able to illegally access another branch site when a two-dimensional code is incorrectly pasted or maliciously tampered with and the online CPE incorrectly establishing an SD-WAN tunnel with another branch site.

Figure 4:
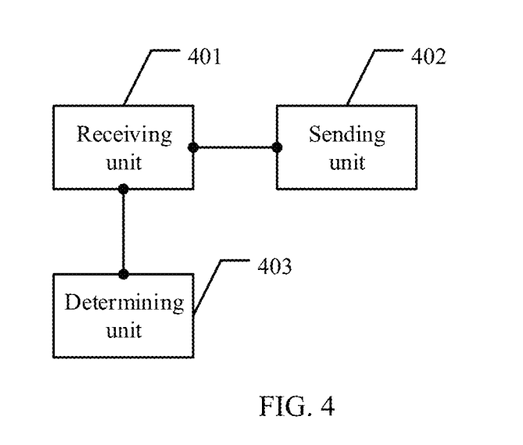
FIG. 4 is a schematic structural diagram of a controller according to an embodiment of this application.

The foregoing describes the configuration method in the embodiments of this application. The following describes a controller in the embodiments of this application. Referring to FIG. 4, an embodiment of the controller in the embodiments of this application includes:

a receiving unit 401, configured to receive a correspondence between a device identifier of a first device and a first location;

a sending unit 402, configured to send, to the first device, a verification request related to verifying whether the first device is located at the first location, where the receiving unit 401 is further configured to receive a verification response to the verification request; and a determining unit 403, configured to determine, based on the verification response, whether to send configuration information corresponding to the first location to the first device.

The verification request is used to request the first device to turn on at least one indicator of the first device in a predetermined manner.

The verification request is used to request a speaker of the first device to produce a sound in a predetermined manner.

The first device is a customer-premises equipment CPE.

The verification request is used to request to verify whether the first device is located at the first location.

The verification request is used to request to determine credibility of the first device based on whether the first device is located at the first location.

The verification request is used to request to determine, based on whether the first device is located at the first location, whether to send the configuration information corresponding to the first location to the first device.

In this embodiment, operations performed by the units of the controller are similar to those described in the embodiments shown in FIG. 2 and FIG. 3, and details are not described herein again.

In this embodiment of this application, the sending unit 402 sends, to the first device, the verification request related to verifying whether the first device is located at the first location, and the determining unit 403 determines, based on the verification response that is received by the receiving unit 401 and that is specific to the verification request, whether to send the configuration information corresponding to the first location to the first device. This avoids the risk of enterprise information leakage caused by the first device being able to access an enterprise internal site without being at the first location when a two-dimensional code is incorrectly pasted or maliciously tampered with.

Figure 5:
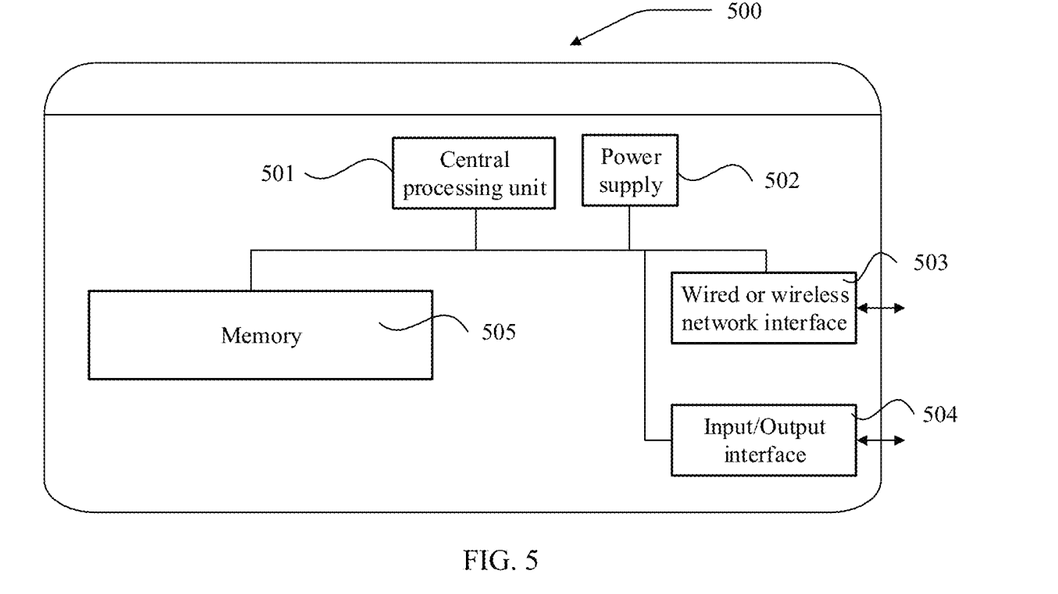
FIG. 5 is another schematic structural diagram of a controller according to an embodiment of this application.

The following describes the controller in the embodiments of this application. Referring to FIG. 5, another embodiment of the controller in the embodiments of this application includes the following components:

A controller 500 may include one or more central processing units (CPU) 501 and a memory 505. The memory 505 stores one or more application programs or data.

The memory 505 may be a volatile memory or a persistent memory. The program stored in the memory 505 may include one or more modules, and each module may include a series of instruction operations for a service server. Further, the central processing units 501 may be configured to communicate with the memory 505, and execute, on the controller 500, the series of instruction operations in the memory 505.

The controller 500 may further include one or more power supplies 502, one or more wired or wireless network interfaces 503, one or more input/output interfaces 504, and/or one or more operating systems such as Windows Server™, Mac OS X™, Unix™, Linux™, and FreeBSD™.

The central processing units 501 may perform the operations performed in the embodiments shown in FIG. 2 and FIG. 3, and details are not described herein again.

In the several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software function unit and is sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes various media that can store a program code, such as a USB flash drive, a removable hard disk, a read-only memory (ROM), a random access memory (RAM), a magnetic disk, or an optical disc.

What is claimed is:

1. A configuration method, comprising:
obtaining, by an onsite deployment device, a device identifier of a first device;
ascertaining, by the onsite deployment device, a first location of the first device;
establishing a correspondence between the device identifier and the first location;
receiving, by a controller, the correspondence between the device identifier and the first location;
sending, to the first device, a verification request related to verifying whether the first device is located at the first location;
receiving a verification response to the verification request that is initiated by the user; and
determining, by the onsite deployment device based on the verification response, whether to send configuration information corresponding to the first location to the first device.

2. The method according to claim 1, wherein the verification request is used to request the first device to turn on at least one indicator of the first device in a predetermined manner.

3. The method according to claim 1, wherein the verification request is used to request a speaker of the first device to produce a sound in a predetermined manner.

4. The method according to claim 1, wherein the method is performed by a software-defined network (SDN) controller.

5. The method according to claim 1, wherein the first device is a customer-premises equipment (CPE).

6. The method according to claim 1, wherein the verification request is used to request to verify whether the first device is located at the first location.

7. The method according to claim 1, wherein the verification request is used to request to determine credibility of the first device based on whether the first device is located at the first location.

8. The method according to claim 1, wherein the verification request is used to request to determine, based on whether the first device is located at the first location, whether to send the configuration information corresponding to the first location to the first device.

9. A configuration system, comprising:
an onsite deployment device;
a controller;
at least one processor; and
one or more memories coupled to the at least one processor and storing an instruction which when executed by the at least one processor, causes the system to:
obtain, by the onsite deployment device, a device identifier of a first device;
ascertain, by the onsite deployment device, a first location of the first device;
establish, by the onsite deployment device, a correspondence between the device identifier and the first location;
receive, by the controller, the correspondence between the device identifier and the first location;
send, to the first device, a verification request related to verifying whether the first device is located at the first location, wherein
receive a verification response to the verification request; and
determine, by the onsite deployment device based on the verification response, whether to send configuration information corresponding to the first location to the first device.

10. The controller according to claim 9, wherein the verification request is used to request the first device to turn on at least one indicator of the first device in a predetermined manner.

11. The controller according to claim 9, wherein the verification request is used to request a speaker of the first device to produce a sound in a predetermined manner.

12. The controller according to claim 9, wherein the first device is a customer-premises equipment (CPE).

13. The controller according to claim 9, wherein the verification request is used to request to verify whether the first device is located at the first location.

14. The controller according to claim 9, wherein the verification request is used to request to determine a credibility of the first device based on whether the first device is located at the first location.

15. The controller according to claim 9, wherein the verification request is used to request to determine, based on whether the first device is located at the first location, whether to send the configuration information corresponding to the first location to the first device.

16. A non-transitory storage medium storing a program that is executable by one or more processors, the program including instructions for:
    obtaining, by an onsite deployment device, a device identifier of a first device;
    ascertaining, by the onsite deployment device, a first location of the first device;
    establishing a correspondence between the device identifier and the first location;
    receiving, by a controller, the correspondence between the device identifier and the first location;
    sending, to the first device, a verification request related to verifying whether the first device is located at the first location;
    receiving a verification response to the verification request; and
    determining, by the onsite deployment device based on the verification response, whether to send configuration information corresponding to the first location to the first device.

17. The non-transitory storage medium according to claim 16, wherein the verification request is used to request the first device to turn on at least one indicator of the first device in a predetermined manner.

18. The non-transitory storage medium according to claim 16, wherein the verification request is used to request a speaker of the first device to produce a sound in a predetermined manner.

19. A computer program product comprising computer-executable instructions stored on a non-transitory computer storage medium that, when executed by a processor, cause an apparatus to:
    obtain, by an onsite deployment device, a device identifier of a first device;
    ascertain, by the onsite deployment device, a first location of the first device;
    establish a correspondence between the device identifier and the first location;
    receive, by a controller, the correspondence between the device identifier of the first device and the first location;
    send, to the first device, a verification request related to verifying whether the first device is located at the first location;
    receive a verification response to the verification request; and
    determine, by the onsite deployment device based on the verification response, whether to send configuration information corresponding to the first location to the first device.

* * * * *

UNITED STATES PATENT AND TRADEMARK OFFICE
CERTIFICATE OF CORRECTION

| | |
|---|---|
| PATENT NO. | : 11,902,093 B2 |
| APPLICATION NO. | : 17/721043 |
| DATED | : February 13, 2024 |
| INVENTOR(S) | : Weiguo Hao et al. |

It is certified that error appears in the above-identified patent and that said Letters Patent is hereby corrected as shown below:

In the Claims

In Column 14, Line 11, in Claim 1, delete "request that is initiated by the user;" and insert -- request; --.

Signed and Sealed this
Seventh Day of May, 2024

Katherine Kelly Vidal
*Director of the United States Patent and Trademark Office*